United States Patent [19]
Brownscombe et al.

[11] Patent Number: 5,290,820
[45] Date of Patent: Mar. 1, 1994

[54] PROCESS FOR PREPARING LOW DENSITY POROUS CROSSLINKED POLYMERIC MATERIALS

[75] Inventors: Thomas F. Brownscombe; Ronald M. Bass; Larry S. Corley, all of Houston, Tex.

[73] Assignee: Shell Oil Company, Houston, Tex.

[21] Appl. No.: 99,018

[22] Filed: Jul. 29, 1993

[51] Int. Cl.$^5$ .............................................. C08J 9/28
[52] U.S. Cl. ...................................... 521/64; 521/62; 521/63
[58] Field of Search .......................... 521/64, 63, 62

[56] References Cited

U.S. PATENT DOCUMENTS

| | | | |
|---|---|---|---|
| 3,992,333 | 11/1976 | Emmons et al. | 260/2.5 |
| 4,522,953 | 5/1987 | Barby et al. | 521/64 |
| 4,668,709 | 5/1987 | Jones et al. | 521/146 |
| 4,788,225 | 11/1988 | Edwards et al. | 521/147 |
| 5,037,859 | 8/1991 | Williams et al. | 521/55 |
| 5,147,345 | 9/1992 | Young et al. | 604/378 |
| 5,149,720 | 9/1992 | DesMarais et al. | 521/63 |
| 5,189,070 | 2/1993 | Brownscombe et al. | 521/64 |
| 5,200,433 | 4/1993 | Beshouri | 521/64 |
| 5,210,104 | 5/1993 | Bass | 521/64 |

FOREIGN PATENT DOCUMENTS

0161526A1 11/1985 European Pat. Off. .

*Primary Examiner*—Morton Foelak

[57] ABSTRACT

In a process for the preparation of a low density porous crosslinked polymeric material by polymerizing a water-in-oil high internal phase emulsion, curing time of the monomers in the emulsion can be reduced without adversely affecting polymer properties by first advancing one or more of the monomers. All or a portion of the monomers are advanced in the presence of an advancement initiator or a free-radical-producing radiation source for about 5% to about 95% of the time effective to form a solid. Then, a water-in-oil high internal phase emulsion is formed with the advanced monomers and optionally additional monomers or the advanced monomers are added to a water-in-oil high internal phase emulsion containing other monomers. The emulsions containing the advanced monomers are cured. The process provides an improved method to incorporate volatile monomers in the porous polymeric material. The curing time is further reduced by carrying out the polymerization and crosslinking in the presence of a alkylperoxycarbonate or a alkylperoxycarboxylate polymerization initiator that is branched at the 1-position and/or the α-position.

43 Claims, No Drawings

PROCESS FOR PREPARING LOW DENSITY POROUS CROSSLINKED POLYMERIC MATERIALS

FIELD OF THE INVENTION

This invention relates to the preparation of low density, porous, crosslinked, polymeric materials. In one aspect, the invention relates to reducing curing time in a high internal phase emulsion polymerization process to manufacture low density porous crosslinked polymeric materials.

BACKGROUND OF THE INVENTION

Polymeric foams can be generally classified as either closed-cell foams or as open-cell foams. Open-cell foams can be used as a matrix to contain various liquids and gases. They are capable of various industrial applications such as, for example, use in wipes and diapers, as carriers and ion exchange resins. For some of these applications, it is desirable to have porous crosslinked polymer blocks which have a very low density and a high capacity of absorbing and retaining liquids. Such high absorption capacity, low density, porous polymer blocks can be prepared by polymerizing a specific type of water-in-oil emulsion known as high internal phase emulsion (HIPE) having relatively small amounts of a continuous oil phase and relatively greater amounts of an internal water phase.

Such high absorption capacity, low density foams are prepared in U.S. Pat. No. 4,522,953 by polymerizing the monomers in the oil phase of a high internal phase water-in-oil emulsion with a water-soluble polymerization initiator such as potassium persulfate. It has been found that in order to obtain foams by this method with high absorption properties and low unreacted monomer content, curing must be conducted for 16 hours or longer at a temperature of 60° C. However, it is desirable to reduce the curing time for a large scale process or a continuous process. Therefore, it will be advantageous to reduce the curing time without significantly affecting the resulting foam properties.

Further, it is desirable to incorporate volatile monomers such as butadiene and isoprene as mentioned in U.S. Pat. No. 5,149,720. However, it is difficult to incorporate these volatile monomers in a low density crosslinked polymeric material ("foam") produced by the high internal phase water-in-oil emulsion. The monomers are difficult to incorporate and tend to volatilize during the preparation and cure of the water-in-oil emulsion. Thus, extremely poor foams in small quantity or closed-cell foams containing these volatile monomers are formed by the conventional high internal phase water-in-oil emulsion method.

It is therefore an object of the present invention to provide a high internal phase water-in-oil emulsion polymerization process with short curing times. It is another object of the present invention to provide an improved method to incorporate volatile monomers in a low density crosslinked polymeric material produced by the high internal phase water-in-oil emulsion process.

SUMMARY OF THE INVENTION

According to the invention, a process for the production of a porous crosslinked polymeric material is provided, comprising the steps of:

(a) providing an aqueous mixture comprising water and an electrolyte;

(b) advancing one or more vinyl monomers in the presence of an effective amount of an advancement initiator or by a free-radical-producing radiation source to produce an advanced monomer component;

(c) adding one or more multifunctional unsaturated crosslinking monomers (i) to the one or more vinyl monomers prior to advancing in step (b), (ii) to the advanced monomer component prior to emulsion forming step (e), or to both (i) and (ii) to form an advanced monomer mixture;

(d) providing a surfactant to the aqueous mixture, the vinyl monomer, the advanced monomer component, the advanced monomer mixture, or any combinations of the aqueous mixture, vinyl monomer, advanced monomer component and advanced monomer mixture;

(e) combining and mixing said aqueous mixture and said advanced monomer mixture in a mixing vessel under conditions effective to produce a water-in-oil emulsion having at least 90 weight percent, based on the emulsion, of water as the internal phase; and (f) heating the emulsion at a temperature of at least about 25° C. to polymerize and crosslink the advanced monomers. A process in which an advanced monomer component is added to a water-in-oil high internal phase emulsion is also provided.

Further, a process in which a branched peroxide is used as the polymerization or an advancement initiator is provided to produce a porous crosslinked polymeric material.

The time necessary for curing the emulsion is reduced without significantly affecting the resulting foam properties by advancing the monomers prior to forming a water-in-oil high internal phase emulsion.

DETAILED DESCRIPTION OF THE INVENTION

It has been found that a low density porous crosslinked polymeric material (hereinafter "foam") with high absorption capacity and low monomer content can be prepared in a shorter curing time (less than about 8 hours) by first advancing (partially polymerizing) the monomers prior to formation of a water-in-oil high internal phase emulsion. These foams generally have a dry density of less than about 0.1 g/cc. Further, it has been now found that desirable open-cell isoprene or butadiene incorporated foams can be produced by the process of the invention.

Many monomers which are gaseous at room temperature (e.g., allene, methyl allene, 1,3-butadiene, vinyl chloride, vinyl fluoride) or low boiling liquids (e.g., isoprene, piperylene, chloroallenes, polyfluoro-olefins) may be useful in foam material prepared by a high internal phase water-in-oil emulsion method. However, their volatility introduces processing problems in terms of loss of monomer during emulsification, requirements for pressurized curing of emulsion, toxic or volatile components present in internal recycle, and/or presence of flammable or toxic vapors in the conventional high internal phase water-in-oil preparation methods. For these reasons, it is often desirable to lower the vapor pressure, volatility, and aqueous solubility of such monomers by advancing the monomers according to the inventive process. In addition, it is desirable to raise the molecular weight of such low molecular weight species for reasons such as compatibility with other components to be added, for example, to reduce reaction of monomers with aqueous salt solutions.

In one embodiment of the inventive process, a foam is produced by advancing at least a portion of a monomer mixture containing at least one vinyl monomer and a multifunctional unsaturated crosslinking monomer in the presence of an advancement initiator or by a free-radical-producing radiation source, thereby producing an advanced monomer mixture, then forming a water-in-oil high internal phase emulsion containing such advanced monomer mixture, water as the internal phase and a surfactant and curing the advanced monomers and monomers in such water-in-oil high internal phase emulsion.

In another embodiment, one or more vinyl monomers are advanced in the presence of an effective amount of an advancement initiator or by a free-radical-producing radiation source to produce an advanced monomer component and the multifunctional unsaturated crosslinking monomer is added to the vinyl monomer prior to advancing, to the advanced monomer component prior to emulsion forming, or to both the vinyl monomer and advanced monomer component to form an advanced monomer mixture. Then, a curable high internal phase water-in-oil emulsion is formed containing the advanced monomer mixture, optionally additional vinyl monomers, surfactant, and aqueous solution as the internal phase. Then the advanced monomers and any monomers in the curable emulsion is cured.

In another embodiment, one or more vinyl monomers are advanced in the presence of an effective amount of an advancement initiator or by a free-radical-producing radiation source to produce an advanced monomer component. The advanced monomer component is then added and mixed to a water-in-oil high internal phase emulsion containing, in the continuous phase of the emulsion, a monomer component containing one or more vinyl monomers, one or more multifunctional unsaturated crosslinking monomers, or a combination of these monomers to form an advanced monomer emulsion. The water-in-oil high internal phase emulsion can be formed in a conventional manner such as those prepared in U.S. Pat. Nos. 4,522,953, 5,149,720 and 5,189,070. Optionally additional vinyl monomers and additional multifunctional unsaturated crosslinking monomers can be added to the advanced monomer component, to the emulsion, to the advanced monomer emulsion, or to any combination of these. Multifunctional unsaturated crosslinking monomers can be added to one or more vinyl monomers to be advanced and advanced along with the vinyl monomers to form the advanced monomer component. If only vinyl monomers are present in the emulsion, one or more multifunctional unsaturated crosslinking monomers can be added to one or more monomers to be advanced, advanced monomer component, to the emulsion, to the advanced monomer emulsion, or to any combination of these in an effective amount to crosslink the monomers to form a foam. Then the advanced monomers and any monomers in the advanced monomer emulsion are cured.

The term "advancement" or "advanced" includes any oligomerization or partial polymerization of some of all of the monomers. The advanced monomers thus generally contain a mixture of monomers, and various oligomers/polymers.

The advancement may be carried out, for example, by mixing the entire monomer mixture together with an advancement initiator, warming to an effective temperature for polymerization and oligomerizing the mixture, or a single component or selected components may be advanced in a similar fashion by themselves and then blended with the rest of the monomers desired in the continuous phase of the emulsion or blended into a water-in-oil high internal phase emulsion containing the rest of the monomers. Which approach is followed will be determined by the objectives desired, since the final molecular structure of the foam will be affected by which route is chosen, and the molecular structure achieved will affect resulting foam properties. Thus, part or all of the monomers may be advanced, and the advanced product may be blended with other monomers for subsequent advancement steps if desired before using the advanced monomers to form a high internal phase water-in-oil emulsion, blended with additional components and forming the emulsion later, or blended into a conventional high internal phase water-in-oil emulsion.

Various monomers may be used in the preparation of the foams, provided the monomers can be dispersed in or form an oil phase of a water-in-oil high internal phase emulsion and have a polymerizable vinyl group. Suitable vinyl monomers include, for example, monoalkenyl arene monomers such as styrene, $\alpha$-methylstyrene, chloromethylstyrene, vinylethylbenzene and vinyl toluene; acrylate or methacrylate esters such as 2-ethylhexyl acrylate, n-butyl acrylate, isobutyl acrylate, t-butyl acrylate, hexyl acrylate, n-butyl methacrylate, lauryl methacrylate, and isodecyl methacrylate; conjugated diolefins such as butadiene, isoprene and piperylene; allenes such as allene, methyl allene and chloroallene; olefin halides such as vinyl chloride, vinyl fluoride and polyfluoro-olefins; and mixtures thereof.

Suitable crosslinking agents can be any multifunctional unsaturated monomers capable of reacting with the vinyl monomers. Multifunctional unsaturated crosslinking monomers include, for example, difunctional unsaturated crosslinking monomers such as divinyl benzene, diethylene glycol dimethacrylate, 1,3-butanediol dimethacrylate, and allyl methacrylate; tri-, tetra- and penta-functional unsaturated crosslinking monomers such as trimethylolpropane trimethacrylate, pentaerythritol tetramethacrylate, trimethylolpropane triacrylate, pentaerythritol tetraacrylate, glucose pentaacrylate, glucose diethylmercaptal pentaacrylate, and sorbitan triacrylate; and poly-functional unsaturated crosslinking monomers such as polyacrylates (eg. sucrose per(meth)acrylate and cellulose (meth)acrylate). Crosslinking monomers are typically present in an amount of from about 2 weight percent to about 70 weight percent, preferably from about 5 weight percent to about 40 weight percent based on the total monomer mixture. Some of these crosslinking monomers can be incorporated as a non-crosslinked monomer as long as at least about 2 weight percent of the crosslinking monomers are crosslinked.

Suitable advancement initiators are monomer-soluble free radical polymerization initiators. Monomer-soluble (oil soluble) free radical polymerization initiators include, for example, azo compounds such as azobisisobutyronitrile (AIBN) and peroxides such as benzoyl peroxide, methyl ethyl ketone peroxides, di-2-ethylhexyl peroxydicarbonate and other alkylperoxycarbonates and alkylperoxycarboxylates including branched peroxides listed below. The advancement initiator should be present in at least an amount effective to partially polymerize or oligomerise the monomers, but can also be in an amount effective to completely polymerize and crosslink the monomers. Typically the advancement initiator can be present from about 0.005 to about 20 weight percent, preferably from about 0.1 to about 4 weight percent based on the monomers. The advancement initiator is added to the monomer mixture containing one or more vinyl monomers with or without the crosslinking monomer and optionally a surfactant.

Suitable free-radical-producing radiation sources are gamma rays, electron beams, neutrons, ultra-violet or other agents capable of inducing free-radical formation. The monomers will generally be exposed to the radical forming source until suitable viscosity is reached. In the event free-radical-producing radiation sources are employed to perform the advancement or cure step, their use during an advancement step offers several advantages: smaller amounts of material, allowing thinner flows or vessels to be treated, commensurate with the penetrating power of these radiations; lack of wastage of energy on the inert internal phase, resulting in higher efficiency; and avoidance of the risk of destabilization of the emulsion by the impingement of the radiation (e.g., in the case of electron beams or other particle beams).

Preferably the monomer mixture is advanced (partially-polymerized) to provide a ratio of viscosity of monomer mixture to water within the range of from about 1000:1 to above 1:2, more preferably from about 50:1 to about 1.5:2. Generally, the ratio of viscosity for a non-advanced monomer to water is about 1:2. The viscosity of the advanced monomer mixture will vary depending on the monomer used.

The viscosity of the advanced monomer will be higher than the viscosity of the unadvanced monomer mixture. The viscosity is also dependent on temperature, and is quite low at ambient temperature, typically about 0.4 cp for the unadvanced monomer mixture, and up to about 100 cp for the advanced monomer mixture. The viscosity will be expressed as a ratio between the viscosity of the monomer mixture and that of the advanced monomer mixture, or the viscosity of the advanced monomer mixture plus surfactant and the unadvanced mixture plus surfactant, because the absolute viscosity values are a function of temperature and whether or not the surfactant has been added to the mixture (normally addition of the surfactant raises the viscosity several-fold). If the advanced mixture is in the numerator, and the non-advanced (fresh) in the denominator, then the ratio should be greater than 1.00 to show advancement. Preferably, the ratio is within the range from about 1.03 to about 50, more preferably from about 1.07 to about 30, most preferably from about 1.15 to about 15. If the ratio is too low, little acceleration of cure time results, but cured foam properties are about those of the unadvanced foam. If the ratio is too high, considerable acceleration of cure time results, but the high viscosity and changed solubility parameters of the largely oligomerized/polymerized mixture may make it difficult to form the proper emulsion. Also as the ratio becomes high, it is very hard to quench the advancement reaction to give a precisely reproducible material. This quenching is easiest if the viscosity ratio is less than about 10, preferably less than about 5. If only a part of the monomer mixture is advanced, the ratio applied to the advanced part may be different, normally a higher ratio, depending on how much of the monomer is advanced.

Since the viscosities are generally low, it is convenient to measure them at $-78°$ C. Thus, the viscosity of a 1:1:3 weight percent mixture of styrene: divinyl benzene: 2-ethylhexyl acrylate is about 300 cp at $-78°$ C. When 12 parts per 100 parts of weight of monomer mixture of a sorbitan monolaurate surfactant is added to the monomer mixture, the viscosity at $-78°$ C. increases to about 2900 cp. On advancing the monomer/surfactant mixture the viscosity increases with time of advancement as described in the illustrative embodiment described below. The level of advancement preferred will depend on the particular mixture of monomers and the relative importance of rapid cure, volatility and properties.

To obtain the advanced monomer mixture, the monomer mixture is heated in the presence of the advancement initiator at a temperature above about 25° C., preferably at a temperature within the range of about 25° C. to about 150° C., more preferably within the range of about 50° C. to about 100° C. for a time effective to form the advanced monomer mixture with a desired viscosity, or irradiated by a free-radical-producing radiation source for a time effective to form the advanced monomer mixture with a desired viscosity. Such time is preferably within the range of about 5% to about 95% of the time necessary to form a solid mixture. The mixture is solid when the mixture no longer visibly deforms. The time necessary to form a solid mixture can be conveniently measured by a Solidity Test described below. When the viscosity of the monomer mixture exceeds that of honey at 25 ° C., it is difficult to form a good emulsion depending on the monomer mixture. Also, greater levels of free water may result after cure when highly advanced monomer solutions are used.

More preferably, the advancement is done for a time within the range of about 10% to about 90%, most preferably from about 35% to about 88% of the time necessary to form a solid mixture. The advanced monomer mixture which is preferred is one which forms a stable emulsion, cures rapidly, and yields a good porous polymeric product relative to the unadvanced monomer mixture. Advancement of the monomer mixture has various advantages besides the acceleration of cure time of the emulsion described above; among these is the ability to use comonomers which are not effective when used directly in the conventional emulsion system such as isoprene and butadiene, the reduction of volatiles from the emulsion curing line, the reduction of soluble organics in recycle water, the elimination of odors, and the use of low boiling monomer mixtures at atmospheric pressure. The shorter cure time in the emulsion process is advantageous due to the smaller curing ovens or continuous process facilities, which result in an overall simplification due to the low volume of the monomer steam (typically 110th to 150th of the emulsion stream resulting from it). Thus it requires typically only 1 gallon of reactor space to advance the monomer for each 30 gallons of reactor space required to cure the emulsion.

To aid in the determination of level of advancement, the level of unsaturation in a mixture of monomers containing double bonds may be assessed by various means, such as infrared determination of the C=C stretching frequency, NMR examination of the vinylic carbons or protons, ultraviolet absorption measurements, dielectric constant, average molecular weight by HPLC, or other means of measuring molecular weight or unsaturation. Level of advancement which is preferred will correlate with the ratioed times previously described. Once the relationship to the ratioed time is determined, such tests serve essentially as a quality control method.

One of the simplest and most direct measures is the reaction of halogen with olefinic bonds. Such tests result in determination of Bromine or Iodine number corresponding to the number of grams of halogen reacted with a certain amount (normally 100g) of the sample. In such a test, the level of reactive unsaturation in the monomer mixture is seen to drop with time of advancement, showing the polymerization of the monomers into higher molecular weight oligomeric species. One such convenient measurement of bromine number, bromine test, is described below.

In one embodiment, if it is desirable to incorporate vinyl chloride for example, into a HIPE foam material, but toxicity concerns limit the amount of gas phase monomer tolerable in the process, the monomer can be mixed with comonomers, such as styrene, divinylbenzene, acrylates, and/or the like, in the presence of an advancement initiator in a sealed reaction vessel, and the reaction vessel warmed to a temperature effective to begin an oligomerization and/or polymerization reaction. After the desired level of reaction has occurred, the vessel may be vented and depressured or evacuated, to remove unreacted vinyl chloride monomer, and leave a polymerizable liquid "advanced monomer" mixture containing vinyl chloride molecules incorporated into larger molecular structures. This advanced monomer then can be polymerized with less potential health hazard of handling vinyl chloride in the mixture, but with the property benefits of the final vinyl chloride containing polymer structure.

In another embodiment, low boiling monomers such as butadiene or isoprene can be readily incorporated in the HIPE foam material either by a monomer mix approach in which a mixture of one or more low boiling monomers, optionally other vinyl monomers, and a crosslinker is advanced preferably until up to about ⅓ of the monomer is used, or the low boiling component itself can be advanced and then blended with the higher boiling components. For example, if it is desired to incorporate 1,3-butadiene into the HIPE foam, it can be done by advancing the butadiene itself to a desired level of molecular weight and low volatility, or suitable level of reaction instead of advancing the entire monomer mixture.

For example, to incorporate butadiene in the porous polymeric product, an autoclave or a pressure reactor ("reaction vessel") can be charged with liquid butadiene, and purged of air by venting some of the butadiene, or alternatively, by chilling the butadiene in liquid nitrogen or in dry ice, and evacuating the gas cap of permanent gases. Optionally other vinyl monomers and crosslinkers can be added. Before charging the butadiene, an effective amount of a suitable advancement initiator such as t-butyl peroxyisobutyrate to advance the butadiene is charged to the reaction vessel. The reaction vessel is then warmed to about 80° C. -85° C. to allow butadiene to react for a time sufficient to lower the butadiene partial pressure. The advancement reaction for low boiling monomers is preferably carried out until the absolute pressure in the reaction vessel at room temperature is less than about 14.7 psia (or below boiling) at atmospheric pressure. For example, if pressure of less than 14.7 psia is required at around 27° C. (80° F.) to be able to handle the monomers at 27° C. (80° F.) without having it boil, the absolute pressure in the reaction vessel should be reduced to a pressure at most of about 60 psia at 82° C. to indicate a level of reaction just sufficient to prevent boiling at 27° C. (80° F.). The pressure at the reaction temperature will vary depending on the monomer mixture advanced. The absolute pressure may be higher than about 60 psia at 82° C. if a mixture of monomers such as advanced butadiene and styrene monomers are mixed before emulsification due to the lower partial pressure of styrene as long as the absolute pressure in the reaction vessel at the handling temperature is less than about 14.7 psia. To make the advanced monomer liquid easier to handle, the reaction may be continued to a lower pressure, for example to about 20 psig at 82° C. which will give about 8.5 psia at 27° C. (80° F.).

High levels of advancement may cause the diene monomers to crosslink sufficiently via 1,2-polymerization to gel. In such a case, a different initiator may be used or a solvent (eg., inert diluent such as hydrocarbons including cyclohexane, carbon tetrachloride and benzene) or other modifier (eg., functional modifier such as tetrahydrofuran and quinuclidine) may be used to affect the course of the reaction by dilution or by reaction modification. In addition, the monomer mixture may be advanced to a lesser degree, and the excess monomer vented to recycle to lower the pressure of the remaining portions which will be utilized in the process.

It may be desirable to verify the vapor pressure of such advanced monomers at lower temperatures. One convenient method of measuring vapor pressure is to use Reid Vapor Pressure equipment developed to determine the vapor pressures of gasolines.

Once the desired pressure range is reached at the reaction temperature, the advanced monomer mixture can be optionally blended with other monomer components to further lower the vapor pressure of the monomer mixture and make the emulsification and curing process simpler. A wide range of temperature may be used to perform the advancement depending on the initiator and the monomer used. For example, for 1,3-butadiene, higher or lower temperatures than about 80° C.-85° C. may be used, but the temperature should be below about 152° C., the critical temperature of butadiene, so that the monomer may remain in the liquid instead of the supercritical gas state. In addition, the temperature should be below the ceiling temperature of the oligomers formed to allow polymerization to occur. On the low temperature side, the temperature should be high enough to give a satisfactory rate with whatever initiator system is used. As a practical matter, that means that for many low boiling volatile monomers, the temperature preferred for the advancement reaction will be within the range from about room temperature to about 150° C., more preferably from about 50° C. to about 100° C.

If the advanced component is to be a major component (more than 50% by weight of the foam), a lower number average molecular weight of preferably less than about 1000, and most preferably less than about 500, of the advanced component is desired. In one embodiment, allene, of molecular weight 40 and boiling point of −35° C., may be selectively dimerized using a suitable initiator to give a mixture of cyclohexadienes, hexatriene, dimethylene cyclobutanes, vinyl methylene cyclopropanes, and bicyclic structures having a molecular weight of 80 and boiling range of about 65° C. to about 82° C. In this event, the vapor pressure of the advanced monomer system is greatly reduced while the number average molecular weight is doubled.

In less selective examples, such as those usually resulting from advancement of conjugated (vs. allenic) dienes, a similar change in vapor pressure will require the formation of higher molecular weight species due to molecular heterogeneity of the advanced sample. The advanced mixture will contain a mixture of macromolecules with different degrees of polymerization/oligomerization, including unreacted monomers. Such oligomerization/polymerizations typically have a ratio, Q, of weight average to number average molecular weight, of 2. However, a mixture of equal weights of monomer of MW=M, and dimer of MW=2 M, will have a number average molecular weight Mn =4/3 M, and a weight average molecular weight Mw=3/2 M. A mixture of an equal number of moles of monomer and dimer will have Mn=3/2 M, and Mw=5/3 M. In the former case, Q =(3/2)/(4/3)=9/8, in the latter, (5/3)/(3/2)=10/9. In order to approach a Q of 2, a wide range of molecular weights (M, 2M, 3M, 4M, etc. in the example above) will be present, since MW's of (n+1)M are formed by a "building up" or "aufbau" reaction of material of MW =(n)M with another molecule of monomer. In a hypothetical mixture, a mixture of 1 mole of M and one mole of tetramer (4M) would have a number average MW of Mn=M(1+4)/2 =2.5M, and a weight average MW of Mw=(0.8x4M +0.2xM) =3.4 M, for a Q of 3.4/2.5=1.36. Even though this hypothetical mixture would have an Mw of 1.7 times that of a pure dimer, the vapor pressure would be higher, greater than 0.2 times the vapor pressure of the monomer. (In the case above, where the dimer may have a vapor pressure of 14.7 psia at 75° C., the hypothetical mixture of monomer and tetramer would have a vapor pressure in excess of 200 psia at 75° C., according to the application of the above equation to data in The Matheson Gas Data Book, The Matheson Company, Inc, East Rutherford, New Jersey, 1961.) Thus, depending on the monomer, it will often be necessary with highly volatile monomers to have an Mw of 5 or more times that of the monomer, for example of 200 or so, to give a mixture of sufficiently high boiling point to provide easy handling under atmospheric pressure at the desired emulsification and cure temperature.

When the constraint of reducing volatility in the presence of a polydisperse oligomer reaction product (setting the lower Mw) is combined with that of having a mixture of sufficiently low viscosity to readily form emulsions with the normal process equipment (setting the upper Mw), the more volatile monomers may provide a most preferred range of Mw of 250 to 700, or Mn of 125 to 350, although values considerably above or below these ranges may be preferred for particular monomers or combinations of monomers, depending on the particular properties of those mixtures. Additionally, specific advancement catalysts may not produce materials of polydispersity (Q)=2, as mentioned above.

In the example being discussed, the advanced volatile monomer mixture can be combined with crosslinking monomers and/or reactive low volatility diluents (e.g. styrene, and methyl methacrylate) to produce a polymerizable oil phase which may then be further advanced (if desired to improve properties or handling) or emulsified and cured directly. The volatile monomers can be combined with the crosslinking monomers and/or reactive low volatility diluents before advancement and advanced together.

Before emulsification, the monomer mixture will be combined normally with suitable oil soluble surfactants, although suitable surfactants could alternatively be dispersed in the aqueous phase before emulsification. The surfactant can be added at any stage to the monomer mixtures, before or after advancement.

The monomer mixture may have additional initiator added to promote the cure of the emulsion, it may cure using the initiator added for the advancement step or one or more additional and different initiators may be added. Many variations, modifications, and extensions of these illustrative cases can be used as long as at least a portion of the monomer mixture, whether one monomer component or part of a mixture of monomers, is advanced prior to emulsification.

For the inventive process, it is also desirable to use a fast curing initiator to reduce the cure time. It has been found that the known oil-soluble initiators reported in the literature such as benzoyl peroxide and AIBN are generally slower than the water-soluble potassium persulfate initiator and provide incomplete curing of the resulting foams without addition of additional polymerization initiators after the formation of the emulsion or in the aqueous mixture. Therefore, it was desirable to develop a faster curing monomer-soluble polymerization initiator.

It has been found that branched alkyl carbonate peroxides branched at the 1-carbon position or branched alkyl carboxylate peroxides branched at the α-carbon position and/or 1-carbon position (hereinafter "branched peroxides") cure faster than the conventional oil-soluble initiator such as benzoyl peroxide. This branching at the 1-carbon position and/or α-carbon position can be secondary or tertiary.

Further, it has been found that the high internal phase water-in-oil foams can be cured by the branched peroxides to completion without the addition of additional polymerization initiator, although for faster cure time additional polymerization initiator can be added.

The preferred branched alkyl carbonate peroxide can be represented by the formula:

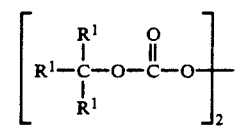

where $R^1$ is independently $C_1$ to $C_{16}$ hydrocarbon groups or hydrogen in which at least two of the $R^1$ are hydrocarbon groups. Hydrocarbon groups can be alkyl, alkenyl or aryl groups.

The preferred branched alkyl carboxylate peroxide can be represented by the formula:

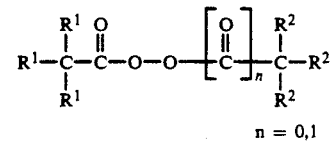

n = 0,1 where $R^1$ and $R^2$ are independently $C_1$ to $C_{16}$ hydrocarbon groups or hydrogen in which at least two of the $R^1$ or $R^2$ are hydrocarbon groups. Preferably at least two of both $R^1$ and $R^2$ are hydrocarbon groups. Hydrocarbon groups can be alkyl, alkenyl or aryl groups.

Examples of the branched peroxides include t-butyl peroxyisobutyrate, t-butyl peroxycrotonate, t-butyl peroxypivalate, di-isobutyryl peroxide, di-t-butyl diperoxyphthalate, t-butyl perbenzoate, cumylperoxy neodecanoate, 2,5-dimethyl-2,5-bis(benzoylperoxy)hexane, 2,5-dimethyl-2,5-bis(2-ethylhexanoylperoxy)hexane, t-butyl peroctoate, 1,1,3,3-tetramethylbutylperoxy-2-ethyl hexanoate, dicyclohexyl peroxydicarbonate, di(sec-butyl) peroxydicarbonate, diisopropyl peroxydicarbonate, and t-butyl peroxyisopropylcarbonate. Commercial examples of the branched peroxide include Lupersol TM 11, Lupersol TM 80, Lupersol TM 118M75, Lupersol TM 225, Lupersol TM 227, Lupersol TM 229, Lupersol TM 256, Lupersol TM 259, Lupersol TM KBD, Lupersol TM TBIC, Luperox TM 118, Luperox TM 229, and Luperox TM IPP (from Atochem North America). The most preferred advancement and/or polymerization initiator is t-butyl peroxyisobutyrate.

These branched peroxide initiators also improve the conventional water-in-oil high internal phase polymerization processes such as those described in U.S. Pat. No. 4,522,953 where no advancement takes place prior to the formation of an emulsion. Further these branched peroxide initiators are also useful when the initiator is added after the formation of the emulsion as described in U.S. Pat. No. 5,210,104, issued May 11, 1993.

When advancement initiators such as benzoyl peroxide, AIBN and methyl ethyl ketone peroxide are used, additional polymerization initiator should be added in the aqueous mixture or in the emulsion. When such polymerization initiator is added to the emulsion, the polymerization initiators can be, for example, oil-soluble (monomer-soluble) initiators such as branched peroxides listed above or water-soluble initiators such potassium persulfate and various redox systems such as ammonium persulfate together with sodium metabisulfite. When such a polymerization initiator is added to the aqueous mixture, the polymerization initiators can be any of the water-soluble initiators mentioned above.

When the additional polymerization initiator is added to the emulsion, it can optionally be blended into the emulsion by any blending technique such as, for example, a static mixer or a pin mixer at a low shear rate, to form a curable water-in-oil high internal phase emulsion. The rate of shear must be high enough to blend the initiator but low enough not to allow the emulsion to coalesce or liquify. Such shear rate should be such that the initiator-added emulsion (i.e, curable water-in-oil high internal phase emulsion) is at least blended sufficiently to form a substantially uniform emulsion but less than the inherent shear stability point. The inherent shear stability point is shear at which the emulsion coalesces due to excess shearing.

The surfactant used in making the high internal phase emulsion which is to be polymerized is also important in forming the water-in-oil high internal phase emulsion. The surfactant can be added to the aqueous phase or monomer phase (monomer mixture) depending on the solubility of the surfactant used. Suitable surfactants include, for example, nonionic surfactants such as sorbitan esters (eg., sorbitan monooleate and sorbitan monolaurate), glycerol esters (eg. glycerol monooleate and glycerol monoricinoleate), PEG 200 dioleate, partial fatty acid esters of polyglycerol, and castor oil 5-10 EO; cationic surfactants such as ammonium salts (eg., distearyl dimethyl ammonium chloride and dioleyl dimethyl ammonium chloride); and anionic surfactants such as bis-tridecyl sulfosuccinic acid salt. Commercially available surfactants include, for example, SPAN ® emulsifying agents 20, 40, 60, 65, 80 and 85 (from Fluka Chemical Corp. or Aldrich Chemical Co.), EMSORB 2502 (from Henkel) and ALKAMULS ® sorbitan esters SML, SMO, SMS, STO and ALKAMULS ® sorbitan ester ethoxylates PMSL-20 and PSMO-20 (from Alkaril Chemicals Ltd.) among others. A combination of sorbitan esters can also be used as described in U.S. Pat. No. 5,200,433 issued Apr. 6, 1993. The amount of surfactant must be such that a water-in-oil high internal phase emulsion will form. Generally, the surfactant is present in an amount effective to form a water-in-oil high internal phase emulsion (HIPE). Preferably, the surfactant can be present from about 2 to about 40% by weight, more preferably about 5 to about 25% by weight based on the monomers.

The relative amounts of the aqueous phase containing water and an electrolyte and monomer phase containing monomer mixtures and/or advanced monomer mixtures used to form the high internal phase emulsions are a factor in determining the structural, mechanical and performance properties of the resulting polymeric foams. The ratio of water to oil in the emulsion can influence the density, cell size, and specific surface area of the foam products. To form a polymeric foam product with suitable density and high absorption capacity, the water-in-oil high internal phase emulsion (HIPE) typically contains as the internal phase, at least about 90 weight percent, based on the emulsion, of water, corresponding to a water to oil weight ratio of at least about 9:1, more preferably at least about 95 weight percent of water, most preferably at least about 97 weight percent of water, corresponding to a water to oil weight ratio of at least about 33:1.

The internal aqueous phase can preferably contain a water-soluble electrolyte to stabilize the HIPE and to make the foam more water wettable. Suitable electrolytes include inorganic salts (monovalent, divalent, trivalent or mixtures thereof), for example, alkali metal salts, alkaline earth metal salts and heavy metal salts such as halides, sulfates, carbonates, phosphates and mixtures thereof. Such electrolyte includes, for example, sodium chloride, sodium sulfate, potassium chloride, potassium sulfate, lithium chloride, magnesium chloride, calcium chloride, magnesium sulfate, aluminum chloride and mixtures thereof. Mono- or di-valent salts with monovalent anions such as halides are preferred.

The formation of a water-in-oil high internal phase emulsion is dependent on a number of factors such as the monomers used, water to oil ratio, type and amount of surfactant used, mixing conditions, and presence and the amount of water-soluble electrolyte. Unless all of these factors are such that they favor formation of a water-in-oil emulsion, the emulsion will be an oil-in-water emulsion rather than water-in-oil high internal phase emulsion. The formation of a water-in-oil emulsion is described in U.S. Pat. No. 4,522,953, the disclosure of which is herein incorporated by reference.

In general, to form the water-in-oil emulsion, the water can be mixed in any way up to a water to oil ratio of about 4:1 An oil-in-water emulsion becomes preferred if the water is added all at once beyond a water to oil ratio of about 4:1. Typically, the water must be added gradually with a moderate rate of shear. A small capacity mixer such as a paint mixer with a shear rate of at least about 5 s$^{-1}$, preferably at east about 10 s$^{-1}$, can be used to mix the water-in-oil emulsion. A larger mixer equipped with an impeller with a shear rate of at least about 10 s$^{-1}$ or a pin gap mixer with a shear rate of at least about 50 s$^{-1}$, preferably at least about 100 s$^{-1}$, can also be used. If the shear rate is too low, the water-in-oil emulsion will revert to an oil-in-water emulsion. It is desirable to at least have a water to oil ratio of about 9:1, preferably at least about 19:1, more preferably at least about 30:1 for a high absorbency capacity foam.

An HIPE can be prepared in batches or continuously. To form an HIPE in batches, the emulsion is formed in a vessel or a container by gradually adding an aqueous phase to an advanced monomer mixture under a moderate rate of shear until the desired water to oil ratio is reached.

An HIPE can be prepared continuously by initially preparing a preformed emulsion of approximately the same character as the desired emulsion by the method described above, then introducing into the preformed emulsion, both the aqueous phase and advanced monomer phase of the emulsion in such proportions so as to produce the desired emulsion while maintaining the emulsified mass in a state of continuous shear which reduces the effective viscosity but not above the inherent shear stability point of the desired emulsion, and then withdrawing the prepared emulsion at the desired rate.

The aqueous phase and the advanced monomer phase for batch and continuous processes can be introduced into a mixing vessel by an aqueous stream or a monomer stream, respectively, through one or more inlets. The streams can be combined prior to or after entering the mixing vessel, then mixed in such a way to produce the desired HIPE. The mixing vessel is any container in which the high internal phase emulsion is made regardless of the type of mixer or mixer head used.

It has been found that by adding advanced monomers prior to the formation of the oil-in-water high internal phase emulsion, the curing process of the emulsion can be accelerated. Further, by using the branched peroxides as the advancement/polymerization initiator, the overall curing process to produce the foams can be accelerated.

The curable water-in-oil high internal phase emulsions (curable HIPE) can be cured in a batch process or in a continuous process. In a batch process, the curable HIPE is collected in a suitable container with the desired shape and cured at a temperature of at least about 25° C. for a time effective to polymerize and to cure the monomers. The HIPE is preferably polymerized and crosslinked (cured) at a temperature within the range of about 25° C. to about 90° C., as long as the emulsion is stable at the curing temperature.

Alternatively, a multiple-step process as described in a U.S. Pat. No. 5,189,070 issued Feb. 23, 1993 can also be used, the disclosure of which is herein incorporated by reference. In the multi-step process the emulsion is precured at a temperature of less than about 65° C. until the emulsion has a Rheometrics dynamic shear modulus of greater than about 500 pascal, (lightly gelled, having a consistency like a jelly or a gelatin referred to as "gel"), then cured at a temperature of above about 70° C. for a time effective to cure the gel. The cure temperature can be as high as about 175° C. under suitable pressure to prevent water from boiling.

The emulsions can be heated, for example, by hot water, hot air, steam, IR, RF, microwave or ohmic heating. The HIPE should be cured until the desired properties are obtained. Typically, to obtain a cured foam, the emulsions should be cured for at least about 4 hours at 60° C. or at least about ½ hour at 60° C. then 3 hours at a temperature of above about 70° C. Generally, the extent of reaction after curing is at least about 85% of the monomers, preferably at least about 90%, more preferably at least about 95% (i.e., less than about 5% of free monomers), most preferably at least about 99% (i.e., less than about 1% of free monomers) in order to obtain good properties.

These foams can be post-cured to improve the foam properties. Better properties such as, for example, increased free swell (i.e., amount of liquid a foam can initially absorb), and/or good resistance to compression deflection (i.e., retention of liquid under load) can be obtained depending on the monomer formulation by post-curing the foam at a temperature of above about 75° C., preferably greater than 90° C., by steam, hot air or other heating source. Such heating may be performed initially in a heat exchanger, oven, over heated rollers or by other means.

When the temperature is near or above the boiling point of water, pressure is preferably applied to keep the water in the liquid phase and to obtain better properties. If desired, the pressure may be lowered to boil some of the water, but in normal practice the water will be maintained in the liquid state to stabilize the monomer. The use of pressure to maintain the aqueous phase and oil phase in the liquid state allows very rapid curing of emulsions at very high temperatures, provided the emulsions are stable at the high temperatures used. Pressure can be applied to the emulsion, if desired, at a pressure generally from above atmospheric pressure, typically within the range of about atmospheric pressure to about 1.03 MPa (150 psig). When the temperature is about 100° C., a pressure from about 7 to 70 kPa gauge (about 1 to 10 psig) is sufficient; when the temperature is about 130° C., a pressure from about 210 to 480 kPa gauge (about 30 psig to 70 psig) is preferred.

For example, the emulsion can be cured under pressure by using an autoclave operating under autogenous pressure of steam generated from pure water at a given temperature, by applying nitrogen or air pressure to prevent boiling of the emulsion or by mechanical means, such as rollers, pistons, molds, or the like.

Once the curing and/or post-curing process is completed, the water incorporated in the foam may be squeezed out, dried by heat or flashed by lowering the pressure to a suitable level to evaporate the remaining liquid to give the desired degree of dryness in the product foam. These drying techniques will preferably be used after the desired state of cure is developed in the foam material.

These foams prepared by the inventive process may be washed prior to, after or between drying stages to yield an absorbent block which is especially useful for the absorption of liquids. Typically, these foams are washed to reduce the electrolyte content of the foam with a solvent such as, for example, an alcohol, a low concentration electrolyte solution (lower concentration than the water phase) such as 1% calcium chloride solution or deionized water. The washed foams can be conveniently dried by squeezing the water and/or solvent out of the foams and air or heat drying.

The foams produced by the inventive process possess high absorption capacities and good uniform properties especially suitable for use as liquid absorbent articles.

ILLUSTRATIVE EMBODIMENT

The following illustrative embodiments describe the process of the invention and are provided for illustrative purposes and are not meant as limiting the invention.

WASHING AND DRYING METHOD

The following washing and drying method was used for all of the examples below: After the foam blocks were cured, the blocks were sliced to 0.35 inches (0.89 cm) thickness. Then, each individual slice was placed on a 0.04 inch (0.1 cm) mesh screen between a 9"×6.75" (22.9 cm×17.1 cm) stainless steel plate that allowed the slice to be squeezed to a 0.045 inch (1.14 mm) thickness. The squeezed slices were placed in an Arbor-press made by DAKE and the calcium chloride solution was squeezed out. The slices were then washed and squeezed twice by soaking the slices in 7.6 liters (2 US gallons) of 1% calcium chloride solution and placing in the Arbor-press. Then, after the slices were squeezed, a paper towel was placed on both sides of the washed slices which were squeezed again to remove excess water from the slices. The slices were then placed in an oven at a temperature of 60° C. for 4 hours to dry. The washed and dried foam slices were analyzed for physical properties as discussed below.

TESTING METHODS

Solidity Test

A flat-tipped probe of about 6 mm diameter is placed on top of an advanced monomer mixture to create a pressure at the flat-tip of about 2.1 kPa (0.3 psi). The ease and penetration of the object into the gel was measured. The monomer mixture is considered solid when the object no longer penetrates or penetrates less than about 1 mm.

Viscosity

At selected times, aliquots of approx. 5 ml are removed and placed in 8 dram vials. If the aliquots are above ambient temperature, the aliquots are then quickly cooled in wet ice to ambient temperature (approx. 24° C.). The aliquots are chilled in acetone/dry ice slush bath for approx. 10 minutes to a temperature of approx. $-78°$ C. The warm aliquots may be chilled immediately to approx. $-78°$ C. While the aliquots are kept cold, the viscosity is run using Brookfield Viscometer, Model RVTD equipped with a #6 Spindle (manufactured by Brookfield Engineering Lab, Stoughton, Mass.).

Bromine Test

Determination of bromine numbers is done potentiometrically using a "bromine number solvent" consisting of acetic acid, trichloroethylene, methanol with 1% sulfuric acid and 1/5% water from Ricca Company. Alternatively, a suitable solvent is 1400 ml of acetic acid, 268 ml of methylene chloride, 268 ml of methanol, and 36 ml of a 1:5 mixture of sulfuric acid and water. 100 Milligrams of sample is dissolved in 100 ml of the solvent and then titrated with 0.5N bromine/bromate titrant in a Kyoto AT310 potentiometric titrator. The titration is done in a sealed cell kept between 0° C. to 5° C., using a platinum double ring electrode. The level of saturation of the solution with bromine is followed potentiometrically, and the bromine number values are reported as grams of bromine reacted per 100 grams of sample.

Free Swell ("FS")/Dry Thickness ("DT")/Foam Density ("FD")/Percent Strain/Resistance to Compression Deflection ("RTCD")

A 2"×2" (5.08×5.08 cm) square is cut from a foam slice. The thickness of the foam sample is measured while it is dry ("dry thickness") using a dead weight thickness gage (a digital linear gage model EG-225 made by Ono Sokki) exerting 50 grams force applied to a 1.60" diameter disk. This thickness is called the "caliper." The foam square is soaked in warm 88° F. (31° C.) Syn-Urine from Jayco for 17 minutes. From the 2"×2" (5.08×5.08 cm) square, a circle of 1.129" (2.868 cm) diameter is cut. This disk is re-equilibrated in the Syn-Urine for 5 minutes. The wet disk is then weighed ("initial wet weight").

The thickness of the wet sample is measured using the same load gage ("initial wet caliper"). The disk is then placed under a 5.1 kPa (0.74 psi) stress where stress is the total dead weight applied to the gage divided by the cross-sectional area. The thickness of the disk is measured under this stress after 15 minutes ("wet caliper"). After 15 minutes, the specimen disk is weighed to measure the retained fluid.

The excess urine is squeezed from the disk and the remainder of the square from which it was cut. The foam is placed in boiling deionized water for 15 minutes. The foam is washed this way several times to remove inorganics. The foam is then removed, blotted dry, then placed in a vacuum oven at 60°–70° C. and dried until the foam has fully expanded. The weight of the dry disk sample is then determined in grams ("final dry weight").

The following values were calculated from the above measurements.

Free swell = initial wet weight/final dry weight

Resistance to Compression Deflection (RTCD) = wet weight after load at 15 minutes/final dry weight $$\% \text{ Strain} = \frac{\text{initial wet caliper} - \text{wet caliper}}{\text{initial wet caliper}} \times 100$$

Foam Volume (cm³) =

(diameter/2)² × 3.142 × initial wet caliper based on a 1.129" diameter circle cut (in cm)

Foam Density (mg/cm³) = final dry weight × 1000/Foam Volume

Vertical Wicking Time ("VWT")

From a foam slice, cut at 0.35 inches (0.89 cm) thickness, a 1 to 2 cm wide strip is cut, greater than 5 cm in length. The strip of foam is clamped or taped to a metal ruler, with the bottom of the foam strip flush with the 0 mark on the ruler. The ruler and foam are placed in a container of approximately 100 ml Syn-Urine from Jayco, in an incubator at 99° F. (37° C.) so the bottom of the strip (0 mark) is barely touching the surface of the Syn-Urine (less than 1 mm). The Synurine is dyed with food coloring to more easily monitor its absorption and rise in the foam. A stopwatch is used to measure the time required for the liquid level to reach 5 cm vertical height in the foam sample.

Percent Free Liquid

The amount of unabsorbed water was measured by decanting fluid from the foam in the container after pre-curing or curing stage and weighing the decanted fluid.

EXAMPLE 1

This example demonstrates the change in viscosity as measured at $-78°$ C. as the monomer mixture is advanced according to the invention.

A 1:1:3 weight ratio of styrene: divinyl benzene: 2-ethylhexyl acrylate was mixed to produce a monomer mixture and viscosity was measured at $-78°$ C. (Commercial divinyl benzene containing 55% divinyl benzene from Aldrich Chemical Co. was used.) To this monomer mixture, 12 parts by weight for 100 parts by weight of the monomer mixture of a sorbitan monolaurate surfactant (SPAN® 20 emulsifying agent from Fluka Chemical Corp. or Aldrich Chemical Co.) was added and viscosity was measured at $-78°$ C. To this mixture 1 part by weight for 100 parts by weight of the monomer mixture of Lupersol TM 80 initiator (t-butyl peroxyisobutyrate from Atochem North America) was added. The resulting mixture was advanced at 75° C. and viscosity was measured at $-78°$ C. periodically as listed in Table 1 below. The viscosities were measured as described above.

TABLE 1

| mixture | Time of Advancement (min) | Viscosity (cp) |
| --- | --- | --- |
| Monomer | — | 300 |
| Monomer/surfactant | 0 | 2900 |
| Monomer/surfactant | 16 | 3060 |
| Monomer/surfactant | 41 | 3260 |
| Monomer/surfactant | 72 | 3930 |
| Monomer/surfactant | 84 | 5600 |
| Monomer/surfactant | 120 | infinite |

EXAMPLE 2

This example demonstrates the change in bromine numbers as the monomer mixture is advanced according to the invention.

A 1:1:3 weight ratio of styrene: divinyl benzene: 2-ethylhexyl acrylate was mixed to produce a monomer mixture. (Commercial divinyl benzene containing 55% divinyl benzene from Aldrich Chemical Co. was used.) To this monomer mixture, 12 parts by weight for 100 parts by weight of the monomer mixture of a sorbitan monolaurate surfactant (SPAN® 20 emulsifying agent from Fluka Chemical Corp. or Aldrich Chemical Co.) was added and bromine number was measured as described above. To this mixture 1 part by weight for 100 parts by weight of the monomer mixture of Lupersol TM 80 initiator (t-butyl peroxyisobutyrate from Atochem North America) was added. The resulting mixture was advanced at 72° C. and bromine number was measured at 20 minute intervals as described above. The bromine numbers are shown in Table 2 below.

TABLE 2

| Time of Advancement (min) | Bromine Number |
| --- | --- |
| — | 49[a] |
| 20 | 50 |
| 40 | 48 |
| 80 | 46 |

TABLE 2-continued

| Time of Advancement (min) | Bromine Number |
| --- | --- |
| 100 | 45 |
| 120 | 43 |

[a]Numbers are +/− 2.

As seen from the above table, the available double bonds have decreased 14% over the advancement time. The particular test used did not give a reliable indication for acrylate double bonds, which reacted more slowly than the styrenic double bonds. Thus, the bromine numbers are low relative to the theoretical numbers for the monomer mixture. However, the data show a clear drop in number of reactive double bonds with time of advancement which can be used to monitor the degree of advancement.

EXAMPLE 3

This example demonstrates the change in bromine numbers as the monomer mixture containing a volatile monomer is advanced according to the invention.

3:2 Weight ratio of isoprene: divinyl benzene were mixed to produce monomer mixtures. (Commercial divinyl benzene containing 55% divinyl benzene from Aldrich Chemical Co. was used.) To these monomer mixtures, 12 parts by weight for 100 parts by weight of the monomer mixtures of a sorbitan monolaurate surfactant (SPAN® 20 emulsifying agent from Fluka Chemical Corp. or Aldrich Chemical Co.) was added. Bromine number of the non-advanced mixture was measured as described above. To these mixtures 1 weight percent for 100 weight percent of the monomer mixtures of Lupersol TM 225 initiator (di(sec-butyl) peroxydicarbonate), Lupersol TM 80 initiator (t-butyl peroxyisobutyrate), Lupersol TM 223 initiator as comparative example (di(2-ethylhexyl) peroxydicarbonate), and Lupersol TM 188M75 initiator (alpha-cumyl peroxyneodecanoate) all from Atochem North America, were added as listed below. The resulting mixture was advanced at the temperatures listed below and bromine numbers were measured as described above. The high temperature advancement runs were performed in an autoclave blanketed with nitrogen under pressures up to 400 psig. The bromine numbers are shown in Table 3 below.

TABLE 3

| Initiator | Temperature (°C.) | Time (min) | Bromine Number |
| --- | --- | --- | --- |
| — | | | 176[a] |
| Lupersol TM 225 | 74–78 | 244 | 140 |
| Lupersol TM 225 | 80–87 | 244 | 160 |
| Lupersol TM 80 | 80–87 | 120 | 148 |
| Lupersol TM 80 | 80–88 | 252 | solid |
| Lupersol TM 223 | 80–86 | 180 | 176 |
| Lupersol TM 188M75 | 80–86 | 240 | 172 |

[a]Numbers are +/− 5.

As seen from the above table, the available bromine double bonds have decreased about 21% over the advancement time. Since the isoprene polymers mostly retain a reactive double bond for each isoprene unit, the 21% observed decrease in double bonds represents from 21% to 42% of complete polymerization cure (depending on whether the monomer has both or only one bond reacted).

As can be seen from the table, Lupersol TM 80 initiator gives a greater degree of advancement at a shorter time when held at 80 to 87° C. although the Self Accelerating Decomposition Temperature (SADT) of Lupersol ™ 80 initiator is higher than for Lupersol ™ 225, 223 or 188M75 initiators (80° C. versus 0° C., 0° C. and 15° C. respectively). The amount of advancement is not just a function of the amount of peroxide decomposed but the matching of the rate of decomposition to the rate of polymerization. (The half life at 80° C. of Lupersol ™ 80 initiator (L80) is ca.7.5 hrs, while Lupersol ™ 223 initiator (L223) is 10 min, Lupersol ™ 225 initiator (L225) is 13 min, and Lupersol ™ 188M75 initiator (L188M75) is ca. 1 hr; at 60° C., the half lives are roughly L80 =110 hrs, L223=0.83 hrs, L225=1.4 hrs, and L188M75 =ca 12.5 hrs, Lucidol Pennwalt, "Evaluation of Organic Peroxides from Half-Life Data", Lucidol Div. of Pennwalt, 1740 Military Road, Buffalo, N.Y. 142140). However, even assuming roughly the same rates of decomposition, the 1-position or α-position branched peroxides such as di(sec-butyl) peroxydicarbonate, t-butyl peroxyisobutyrate and alpha-cumyl peroxyneodecanoate are clearly more effective at advancing the monomers than peroxides not branched at the 1-position or α-position such as di(2-ethylhexyl) peroxydicarbonate.

EXAMPLE 4

This example demonstrates the reduction in cure time with increased advancement time according to the invention.

A 1:1:3 weight ratio of styrene: divinyl benzene: 2-ethylhexyl acrylate were mixed to produce a monomer mixture. (Commercial divinyl benzene containing 55% divinyl benzene from Aldrich Chemical Co. was used.) To this monomer mixture, 12 parts by weight for 100 parts by weight of the monomer mixture of a sorbitan monolaurate surfactant (SPAN ® 20 emulsifying agent from Fluka Chemical Corp. or Aldrich Chemical Co.) was added and bromine number was measured as described above. To this mixture 1 part by weight for 100 parts by weight of the monomer mixture of Lupersol ™ 80 initiator (t-butyl peroxyisobutyrate from Atochem North America) was added. The resulting mixture was advanced at 80° C. for a specified time as listed below. A 30:1 water-in-oil emulsion was made by mixing a 70° C. aqueous solution of 10% CaCl$_2$ and 0.14% potassium persulfate into the advanced monomer mixtures with an air motor and a paint mixer. Each emulsion was cured in a 60° C. water bath in a 118 cm$^3$ (4 fluid oz.) bottle. Cure Time was determined by determining the time necessary for the emulsion to support a 2.1 kPa (0.3 psi) flat tipped probe at the surface of the emulsion and listed below in Table 4.

TABLE 4

| Advancement Time (min) | Cure Time (min) |
|---|---|
| 0 | 144 |
| 16 | 136 |
| 29 | 121 |
| 41 | 112 |
| 53 | 94 |
| 111 | 61 |
| 125 | Solid during advancement |

EXAMPLE 5

This example demonstrates preparation of a low density crosslinked polymeric material by advancing the monomer mixture according to the invention.

In a container, 100.09 g of a monomer mixture (19.11 wt % styrene, 20.63 wt % divinyl benzene and 60.26 wt % of 2-ethyl hexyl acrylate) is mixed with 1.06 g of t-butyl peroxyisobutyrate (Lupersol ™ 80 from Atochem North America). For divinyl benzene, commercial divinyl benzene containing 55% divinyl benzene from Aldrich Chemical Co. was used. To 80.03 g of the initiator-containing monomer mixture which has been heated for 12 minutes in a 80° C. water bath, 10 g of Span ® 20 emulsifying agent (sorbitan monolaurate from Fluka Chemical Corp. or Aldrich Chemical Co.) was added to give a 12.35% surfactant-containing mixture ("mixture-A" 12 minutes aging).

While stirring with a paint stirrer (model 06200 PM-70 made by SHUR-LINE ® Inc.) attached to an air motor (#C-1712 1/2hp motor made by Arrow Engineering Co.), 600 cc of aqueous 10 wt % CaCl$_2$ and 0.15 wt % potassium persulfate solution was slowly added to 20.03 g of mixture-A which had been heated at 80° C. for 16 minutes. A water-in-oil high internal phase emulsion formed with a desired 30:1 water-to-oil ratio. 60.87 g of the resulting emulsion was poured into a 118 cm$^3$ (4 fluid oz.) jar and labeled B1. The remaining emulsion (521.41 g) was poured into a 1.4 liter (3 US pint) tub and labeled B2. The emulsion was cured by placing this jar B1 in a 60° C. water bath and periodically tested with a flat-tipped probe of about 6 mm diameter which creates a pressure at the flat-top of about 0.3 psi ("the probe") by placing the probe on top of the emulsion. After 136 minutes, the probe sat on top of the foam and did not sink. The emulsion in the tub was cured by heating the tub B2 in a 60° C. incubator for 24 hours. 3.13 % of free water was poured off from the resulting foam.

While stirring in a similar manner to above, 600 cc of aqueous 10 wt % CaCl$_2$ and 0.15 wt % potassium persulfate solution was slowly added to 20.29 g of mixture-A which had been heated at 80° C. for 29 minutes. 59.78 g of the resulting emulsion was poured into a 118 cm$^3$ (4 fluid oz.) jar and labeled C1. The remaining emulsion (558.0 g) was poured into a 1.4 liter (3 US pint) tub and labeled C2. The emulsion was cured by placing this jar C1 in a 60° C. water bath and periodically tested by placing the probe described above on top of the emulsion. After 121 minutes, the probe sat on top of the foam and did not sink. The emulsion in the tub was cured by heating the tub C2 in a 60° C. incubator for 24 hours. 2.74 % of free water was poured off from the resulting foam.

While stirring in a similar manner to above, 600 cc of aqueous 10 wt % CaCl$_2$ and 0.15 wt % potassium persulfate solution was slowly added to 20.32 g of mixture-A which had been heated at 80° C. for 41 minutes. 62.18 g of the resulting emulsion was poured into a 118 cm$^3$ (4 fluid oz.) jar and labeled D1. The remaining emulsion (552.48 g) was poured into a 2.4 liter (3 US pint) tub and labeled D2. The emulsion was cured by placing this jar D1 in a 60° C. water bath and periodically tested by placing the probe described above on top of the emulsion. After 112 minutes, the probe sat on top of the foam and did not sink. The emulsion in the tub was cured by heating the tub D2 in a 60° C. incubator for 24 hours. 2.08 % of free water was poured off from the resulting foam.

While stirring in a similar manner to above, 600 cc of aqueous 10 wt % CaCl$_2$ and 0.15 wt % potassium persulfate solution was slowly added to 20.2 g of mixture-A which had been heated at 80° C. for 53 minutes. 61.94 g of the resulting emulsion was poured into a 118 cm$^3$ (4 fluid oz.) jar and labeled E1. The remaining emulsion (543.82 g) was poured into a 1.4 liter (3 US pint) tub and labeled E2. The emulsion was cured by placing this jar E1 in a 60° C. water bath and periodically tested by placing the probe described above on top of the emulsion. After 94 minutes, the probe sat on top of the foam and did not sink. The emulsion in the tub was cured by heating the tub E2 in a 60° C. incubator for 23 hours. 1.77 % of free water was poured off from the resulting foam.

In a container, 99.77 g of a monomer mixture (19.11 wt % styrene, 20.63 wt % divinyl benzene and 60.26 wt % of 2-ethyl hexyl acrylate) was mixed with 1.19 g of t-butyl peroxyisobutyrate (Lupersol ™ 80 from Atochem, North America) and 11.98 g of Span ® 20 emulsifying agent (sorbitan monolaurate from Fluka Chemical Corp. or Aldrich Chemical Co.) ("mixture-F"). For divinyl benzene, commercial divinyl benzene containing 55% divinyl benzene from Aldrich Chemical Co. was used.

While stirring in a similar manner to above, 600 cc of aqueous 10 wt % $CaCl_2$ and 0.15 wt % potassium persulfate solution was slowly added to 20.07 g of mixture-F which had been heated at 80° C. for 60 minutes. 62.99 g of the resulting emulsion was poured into a 118 $cm^3$ (4 fluid oz.) jar and labeled H1. The remaining emulsion (538.63 g) was poured into a 1.4 liter (3 US pint) tub and labeled G2. The emulsion was cured by placing this jar G1 in a 60° C. water bath and periodically tested by placing the probe described above on top of the emulsion. After 134 minutes, the probe sat on top of the foam and did not sink. The emulsion in the tub was cured by heating the tub G2 in a 60° C. incubator for 22 hours. 4.94 % of free water was poured off from the resulting foam.

While stirring in a similar manner to above, 600 cc of aqueous 10 wt % $CaCl_2$ and 0.15 wt % potassium persulfate solution was slowly added to 20.27 g of mixture-F which had been heated at 80° C. for 72 minutes. 61.08 g of the resulting emulsion was poured into a 118 $cm^3$ (4 fluid oz.) jar and labeled H1. The remaining emulsion (557.67 g) was poured into a 1.4 liter (3 US pint) tub and labeled H2. The emulsion was cured by placing this jar H1 in a 60° C. water bath and periodically tested by placing the probe described above on top of the emulsion. After 132 minutes, the probe sat on top of the foam and did not sink. The emulsion in the tub was cured by heating the tub H2 in a 60° C. incubator for 21 hours. 6.8 % of free water was poured off from the resulting foam.

While stirring in a similar manner to above, 600 cc of aqueous 10 wt % $CaCl_2$ and 0.15 wt % potassium persulfate solution was slowly added to 20.21 g of mixture-F which had been heated at 80° C. for 84 minutes. 59.22 g of the resulting emulsion was poured into a 118 $cm^3$ (4 fluid oz.) jar and labeled I1. The remaining emulsion (551.61 g) was poured into a 1.4 liter (3 US pint) tub and labeled I2. The emulsion was cured by placing this jar I1 in a 60° C. water bath and periodically tested by placing the probe described above on top of the emulsion. After 119 minutes, the probe sat on top of the foam and did not sink. The emulsion in the tub was cured by heating the tub I2 in a 60° C. incubator for 20.33 hours. 1.6 % of free water was poured off from the resulting foam.

While stirring in a similar manner to above, 600 cc of aqueous 10 wt % $CaCl_2$ and 0.15 wt % potassium persulfate solution was slowly added to 19.98 g of mixture-F which had been heated at 80° C. for 97 minutes. 63.78 g of the resulting emulsion was poured into a 118 $cm^3$ (4 fluid oz.) jar and labeled J1. The remaining emulsion (524.59 g) was poured into a 1.4 liter (3 US pint) tub and labeled J2. The emulsion was cured by placing this jar J1 in a 60° C. water bath and periodically tested by placing the probe described above on top of the emulsion. After 110 minutes, the probe sat on top of the foam and did not sink. The emulsion in the tub was cured by heating the tub J2 in a 60° C. incubator for 19 hours. 2.21% of free water was poured off from the resulting foam.

While stirring in a similar manner to above, 600 cc of aqueous 10 wt % $CaCl_2$ and 0.15 wt % potassium persulfate solution was slowly added to 20.06 g of mixture-F which had been heated at 80° C. for 111 minutes. 69.02 g of the resulting emulsion was poured into a 118 $cm^3$ (4 fluid oz.) and labeled K1. The remaining emulsion (552.48 g) was poured into a 1.4 liter (3 US pint) tub and labeled K2. The emulsion was cured by placing this jar K1 in a 60° C. water bath and periodically tested by placing the probe described above on top of the emulsion. After 61 minutes, the probe sat on top of the foam and did not sink. The emulsion in the tub was cured by heating the tub K2 in a 60° C. incubator for 18.25 hours. 6.65 % of free water was poured off from the resulting foam.

After 125 minutes, the remaining mixture-F was solid as tested by the above solidity test.

The properties of #2, tub samples are listed in Table 5.

EXAMPLE 6

This example demonstrates another preparation of a low density crosslinked polymeric material by advancing the monomer mixture according to the invention and comparison run N.

A mixture-M was prepared in a similar manner to Example 5, except 100.23 g of monomer mixture (20.26 wt % styrene, 19.91 wt % divinyl benzene and 60.06 wt % of 2-ethyl hexyl acrylate) was mixed with 1.14 g of t-butyl peroxyisobutyrate (Lupersol ™ 80 from Atochem, North America) and 12.34g of Span ® 20 emulsifying agent (sorbitan monolaurate from Fluka Chemical Corp. or Aldrich Chemical Co.).

To 20.03 g of mixture-M, 600 cc of aqueous 10 wt % $CaCl_2$ and 0.15 wt % potassium persulfate solution was slowly added as in Example 5. 60.03 g of the resulting emulsion was poured into a 118 $cm^3$ (4 fluid oz.) jar and labeled N1. The remaining emulsion (540.28 g) was poured into a 1.4 liter (3 US pint) tub and labeled N2. The emulsion was cured by placing this jar N1 in a 60° C. water bath and periodically tested by placing the probe described in Example 5 on top of the emulsion. After 127 minutes, the probe sat on top of the foam and did not sink. The emulsion in the tub was cured by heating the tub N2 in a 60° C. incubator for 23 hours. 2.81 % of free water was poured off from the resulting foam.

In a similar manner to above, 600 cc of aqueous 10 wt % CaCl2 and 0.15 wt % potassium persulfate solution was slowly added to 19 91 g of mixture-M which had been heated at 80° C. for 12 minutes. 59.03 g of the resulting emulsion was poured into a 118 $cm^3$ (4 fluid oz.) jar and labeled O1. The remaining emulsion (531.0 g) was poured into a 1.4 liter (3 US pint) tub and labeled O2. The emulsion was cured by placing this jar O1 in a 60° C. water bath and periodically tested by placing the probe described above on top of the emulsion. After 114 minutes, the probe sat on top of the foam and did not sink. The emulsion in the tub was cured by heating the tub 02 in a 60° C. incubator for 22.75 hours. 6.02 % of free water was poured off from the resulting foam.

In a similar manner to above, 600 cc of aqueous 10 wt % CaCl₂ and 0.15 wt % potassium persulfate solution was slowly added to 20.1 g of mixture-M which had been heated at 80° C. for 26 minutes. 62.88 g of the resulting emulsion was poured into a 118 cm³ (4 fluid oz.) and labeled P1. The remaining emulsion (519.21 g) Was poured into a 1.4 liter (3 US pint) tub and labeled P2. The emulsion was cured by placing this jar P1 in a 60° C. water bath and periodically tested by placing the probe described above on top of the emulsion. After 89 minutes, the probe sat on top of the foam and did not sink. The emulsion in the tub was cured by heating the tub P2 in a 60° C. incubator for 22.5 hours. 0% of free water was poured off from the resulting foam.

In a similar manner to above, 600 cc of aqueous 10 wt % CaCl₂ and 0.15 wt % potassium persulfate solution was slowly added to 20.12 g of mixture-N which had been heated at 80° C. for 37 minutes. 65.75 g of the resulting emulsion was poured into a 118 cm³ (4 fluid oz.) jar an labeled Q1. The remaining emulsion (531.74 g) was poured into a 1.4 liter (3 US pint) tub and labeled Q2. The emulsion was cured by placing this jar Q1 in a 60° C. water bath and periodically tested by placing the probe described above on top of the emulsion. After 78 minutes, the probe sat on top of the foam and did not sink. The emulsion in the tub was cured by heating the tub Q2 in a 60° C. incubator for 22.25 hours. 4.36% of free water was poured off from the resulting foam.

In a similar manner to above, 600 cc of aqueous 10 wt % CaCl₂ and 0.15 wt % potassium persulfate solution was slowly added to 19.99 g of mixture-N which had been heated at 80° C. for 48 minutes. 67.74 g of the resulting emulsion was poured into a 118 cm³ (4fluid oz.) jar and labeled R1. The remaining emulsion (620.61 g) wa poured into a 1.4 liter (3 US pint) tub and labeled R2. The emulsion was cured by placing this jar R1 in a 60° C. water bath and periodically tested by placing the probe described above on top of the emulsion. After 82 minutes, the probe sat on top of the foam and did not sink. The emulsion in the tube as cured by heating the tub R2 in a 60° C. incubator for 22 hours. 17.03% of free water was poured off from the resulting foam.

The properties of #2, tub samples, are listed in Table 5 below.

TABLE 5

| Sample | % Strain | RTCD | FD | FS | DT | VWT |
|---|---|---|---|---|---|---|
| B2 | 17.4 | 17.3 | 34.4 | 19.9 | .447 | 71S |
| C2 | 11.9 | 15.0 | 37.2 | 15.8 | .386 | 145S |
| D2 | 19.8 | 21.1 | 34.4 | 24.3 | .342 | 90S |
| E2 | 22.4 | 10.7 | 32.6 | 21.1 | .396 | 67S |
| G2 | 56.4 | 17.5 | 27.2 | 34.9 | .344 | 70S |
| H2 | 37.0 | 15.8 | 35.9 | 19.1 | .366 | 58S |
| I2 | 21.4 | 15.8 | 35.9 | 19.1 | .366 | 68S |
| J2 | 28.6 | 19.4 | 33.8 | 23.9 | .380 | 76S |
| K2 | 17.9 | 18.9 | 39.7 | 20.9 | .391 | 161S |
| N2 | 28.4 | 18.7 | 33.1 | 23.8 | .110 | 92S |
| O2 | 14.2 | 15.7 | 34.9 | 17.3 | .379 | 91S |
| P2 | 9.5 | 16.5 | 36.8 | 17.2 | .411 | 148S |
| Q2 | 10.5 | 14.4 | 37.3 | 15.0 | .388 | 128S |
| R2 | 12.3 | 15.9 | 46.8 | 16.8 | .313 | 128S |

As can be seen from Table 5, the foams produced according to the process of the invention (obtained from the advanced monomer mixture) have comparable or better foam properties compared with an unadvanced conventionally prepared material of N2.

EXAMPLE 7

This example demonstrates the advantage of the process of the invention for volatile monomers.

A 3:2 weight ratio of isoprene: divinyl benzene were mixed to produce a monomer mixture. (Commercial divinyl benzene containing 55% divinyl benzene from Aldrich Chemical Co. was used.) To this monomer mixture, 12 parts by weight for 100 parts by weight of the monomer mixture of a sorbitan monolaurate surfactant (SPAN ® 20 emulsifying agent from Fluka Chemical Corp. or Aldrich Chemical Co.) was added. To this mixture 1 part by weight for 100 parts by weight of the monomer mixture of Lupersol TM 225 initiator (di(sec-butyl) peroxydicarbonate) from Atochem North America was added. The resulting mixture was advanced at the temperatures listed below. The high temperature advancement runs were performed in an autoclave blanketed with nitrogen under pressures up to 400 psig.

The mixtures were advanced for the times indicated below. To each advanced mixture an aqueous phase containing 10% CaCl₂ was added slowly to the advanced monomer mixture while stirring as in Example 5 to form a water-in-oil emulsion. The emulsion was poured into a 118 cm³ (4 fluid oz.) jar and cured for a time and temperature as indicated in Table 6 below. Cure Time was determined by determining the time necessary for the emulsion to support a 2.1 kPa (0.3 psi) flat tipped probe at the surface of the emulsion.

TABLE 6

| Advancement | | Bromine | | |
|---|---|---|---|---|
| Time | Temp. | No. | Cure Time | Foam Properties |
| 0 | | 175+ | >400 min. | Poor, Closed Cell Many Voids |
| 250 min | 60–80° C. | 144 | 260 min. | Normal to Poor |
| 260 min | 74–78° C. | 140 | 200 min. | Normal to Good |
| 244 min | 80–87° C. | 160 | 183 min. | Normal |

As seen from the Table above, the effect of curing the emulsion containing a high mole fraction of isoprene as shown above at 60° C. without advancement produces formation of closed cell foams, and broken, cracked, and disintegrated foam chuncks. At the curing temperature without advancement, emulsions containing such high mole fractions of isoprene forms pockets of gas, giving a "Swiss Cheese" appearance with many large voids when sliced. However, with the inventive process using advancement steps an open celled foam with good properties can be produced.

EXAMPLE 8

This example further demonstrates the process of the invention.

1:1:3 Weight ratio of styrene: divinyl benzene:2-ethylhexyl acrylate were mixed to produce monomer mixtures. (Commercial divinyl benzene containing 55% divinyl benzene from Aldrich Chemical Co. was used.) To these monomer mixtures, 12 parts by weight for 100 parts by weight of the monomer mixture of a sorbitan monolaurate surfactant (SPAN ® 20 emulsifying agent from Fluka Chemical Corp. or Aldrich Chemical Co.) was added. To these mixtures 1 part by weight for 100 parts by weight of the monomer mixture of the advancement initiators listed below were added. The resulting mixtures were advanced at the temperatures listed below and for the time listed below in Table 7.

To these advanced mixtures an aqueous phase containing 10% CaCl₂ was added slowly to the advanced monomer mixtures while stirring as in Example 5 to form a water-in-oil emulsion. In some batches as indicated in the Table below, 1 part by weight for 100 parts by weight of the monomer mixture of peroxide polymerization initiators or 0.14 part by weight for 100 parts by weight of the monomer mixture of potassium persulfate ("KPS") were added to the emulsion and mixed. The emulsions were poured into a 118 cm³ (4 fluid oz.) jar and cured at 60° C.. Cure Time was determined by determining the time necessary for the emulsion to support a 2.1 kPa (0.3 psi) flat tipped probe at the surface of the emulsion and listed below in Table 7.

TABLE 7

| | Advancement | | Cure | Time |
|---|---|---|---|---|
| Time | Temp. | Initiator | Initiator | (min.) |
| 0 min | — | — | Benzoyl peroxide | Would not cure |
| 0 min | | | Lupersol ™ 80ᵃ | 212 |
| 24 min | 75° C. | Lupersol 80 | — | 190 |
| 24 min | 75° C. | Lupersol 80 | KPS | 190 |
| 36 min | 75° C. | Lupersol 80 | KPS | 179 |
| 60 min | 75° C. | Lupersol 80 | | Solidified during advancement |
| 0 min | | Benzoyl peroxide | Lupersol 80 | 95 |
| 12 min | 75° C. | Benzoyl peroxide | Lupersol 80 | 100 |
| 24 min | 75° C. | Benzoyl peroxide | Lupersol 80 | 95 |
| 0 min | | Lupersol 80 | Benzoyl peroxide | 173 |
| 12 min | 75° C. | Lupersol 80 | Benzoyl peroxide | 177 |
| 24 min | 75° C. | Lupersol 80 | Benzoyl peroxide | 173 |
| 48 min | 75° C. | Lupersol 80 | Benzoyl peroxide | 154 |
| 60 min | 60° C. | Benzoyl peroxide | — | 158 |
| 60 min | 60° C. | Benzoyl peroxide | KPS | 98 |

ᵃt-butyl peroxyisobutyrate from Atochem North America.

As seen from the Table above, the emulsion did not cure properly using benzoyl peroxide as the polymerization initiator without advancement. The emulsion cured to form a foam when benzoyl peroxide was used as an advancement initiator in the oil phase before formation of the emulsion.

EXAMPLE 9

This example demonstrates another preparation of a low density crosslinked polymeric material by advancing the monomer mixture according to the invention.

A 1:1:3 weight ratio of styrene: divinyl benzene:2-ethylhexyl acrylate were mixed to produce a monomer mixture. (Commercial divinyl benzene containing 55% divinyl benzene from Aldrich Chemical Co. was used.) To this monomer mixture, 12 parts by weight for 100 parts by weight of the monomer mixture of a sorbitan monolaurate surfactant (SPAN ® 20 emulsifying agent from Fluka Chemical Corp. or Aldrich Chemical Co.) was added. To this mixture 1 part by weight for 100 parts by weight of the monomer mixture of Lupersol ™ 80 (t-butyl peroxyisobutyrate from Atochem North America) was added. The resulting mixture was advanced at 75° C. for approximately 20 minutes.

To this advanced mixture an aqueous phase containing 10% CaCl₂ was added slowly to the advanced monomer mixture while stirring as in Example 5 to form a water-in-oil emulsion. No additional polymerization initiator was added. The emulsion was poured into a 1.5 liter (3 US pint) tub and cured at 60° C. for 16 hours. The properties of the foam are shown in Table 8 below.

EXAMPLE 10

This example demonstrates another preparation of a low density crosslinked polymeric material by advancing the monomer mixture according to the invention.

1:1:3 Weight ratio of styrene: divinyl benzene:2-ethylhexyl acrylate were mixed to produce monomer mixtures. (Commercial divinyl benzene containing 55% divinyl benzene from Aldrich Chemical Co. was used.) To these monomer mixtures, 12 parts by weight for 100 parts by weight of the monomer mixture of a sorbitan monolaurate surfactant (SPAN ® 20 emulsifying agent from Fluka Chemical Corp. or Aldrich Chemical Co.) was added. To these mixtures 1 part by weight for 100 parts by weight of the monomer mixture of Lupersol ™ 80 (t-butyl peroxyisobutyrate from Atochem North America) for Example 10 A and benzoyl peroxide (from Aldrich Chemical Co.) for Example 10 B were added. The resulting mixtures were advanced at 75° C. for 12 minutes.

To these advanced mixture an aqueous phase containing 10% CaCl₂ was added slowly to the advanced monomer mixtures while stirring as in Example 5 to form water-in-oil emulsions. To these emulsions, 1 part by weight for 100 parts by weight of the monomers of benzoyl peroxide for Example 10A and Lupersol ™ 80 for Example 10B were added and mixed. The emulsions were poured into a 1.5 liter (3 US pint) tub and cured at 60° C. for 16 hours. The properties of the foams are shown in Table 8 below.

TABLE 8

| Example | % Strain | RTCD | FD | FS | DT | VWT |
|---|---|---|---|---|---|---|
| 9 | 26.7 | 19.3 | 34.1 | 24.4 | .129 | 126 |
| 10A | 35.6 | 28.1 | 32.5 | 26.4 | .363 | 70 |
| 10B | 46 | 16.8 | 32.6 | 28.5 | 0.129 | 168 |

As can be seen from Table 8, the foams produced by the advancement process of the invention have comparable to superior properties compared with the comparative example, Example 6, N2, particularly in foam absorption capacity such as Free Swell.

We claim:

1. A process for the production of a porous crosslinked polymeric material comprising:
   (a) providing an aqueous mixture comprising water an electorlyte;
   (b) advancing one or more vinyl monomers in the presence of an effective amount of an advancement initiator or by a free-radical-producing radiation source to produce an advanced monomer component having a viscosity ratio of advanced monomer component to the non-advanced monomer of greater than 1.00;
   (c) adding one or more multifunctional unsaturated crosslinking monomers (i) to the one or more vinyl monomers prior to advancing in step (b), (ii) to the advanced monomer component prior to emulsion forming step (e), or to both (i) and (ii) to form an advanced monomer mixture;
   (d) providing a surfactant to the aqueous mixture, the vinyl monomer, the advanced monomer component, the advanced monomer mixture, or any combinations of the aqueous mixture, vinyl monomer, advanced monomer component and advanced monomer mixture;
   (e) combining and mixing said aqueous mixture and said advanced monomer mixture in a mixing vessel under conditions effective to produce a water-in-oil emulsion having at least 90 weight percent, based on the emulsion, of water as the internal phase;

(f) heating the emulsion at a temperature of at least about 25° C. to polymerize and crosslink the advanced monomers; and (g) removing at least a portion of water from said cross-linked emulsion thereby producing a porous cross-linked polymeric material.

2. The process of claim 1 in which the one or more vinyl monomers is advance by a monomer-soluble free-radical polymerization initiator.

3. The process of claim 2 in which the advancement initiator is present in an amount of about 0.005 to about 20 weight percent based on the monomer component in step (b).

4. The process of claim 1 in which the one or more vinyl monomers is advanced by a free-radical-producing radiation source selected from the group consisting of gamma rays, electron beams, neutrons and ultra-violet light.

5. The process of claim 3 in which the advancement initiator is an azo compound or a peroxide.

6. The process of claim 5 in which the advancement initiator is selected from the group consisting of alkylperoxycarbonates branched at the 1-carbon position or alkylperoxycarboxylates branched at the α-carbon position and/or 1-carbon position.

7. The process of claim 1 in which the emulsion further comprises additional polymerization initiator.

8. The process of claim 1 further adding one or more additional vinyl monomers in step (c) to form the advanced monomer mixture.

9. The process of claim 1 in which at least one of the vinyl monomers is selected from the group consisting of monoalkenyl arenes, acrylate or methacrylate esters, conjugated diolefins, allenes, olefin halides and mixtures thereof.

10. The process of claim 9 in which at least one of the multifunctional unsaturated crosslinking monomers is selected from the group consisting of divinyl benzene, diethylene glycol dimethacrylate, 1,3-butanediol dimethyacrylate, allyl methyacrylate, trimethylolpropane trimethyacrylate, trimethylolpropane triacrylate, pentaerythritol tetramethyacrylate, pentaerythritol tetraacrylate, glucose pentaacryalate, sorbitan triacrylate, glucosediethylmercaptal pentaacrylate, sucrose per acrylalte, sucrose permethyacrylate, cellulose methacrylate and cellulose acrylate.

11. The process of claim 9 in which the advancement step (b) is carried out in the further presence of a solvent or a modifier.

12. The process of claim 1 in which the advanced monomer component has a viscosity ratio of advanced monomer component to the non-advanced monomer within the range of from about 1.03 to about 50.

13. A process for the production of a porous cross-linked polymeric material comprising:

(a) providing an aqueous mixture comprising water and an electrolyte;

(b) advancing one or more vinyl monomers in the presence of an effective amount of an advancement initiator or by a free-radical-producing radiation source for about 5% to about 95% of the time effective to form a solid thereby producing an advanced monomer component;

(c) adding one or more multifunctional unsaturated crosslinking monomers (i) to the one or more vinyl monomers prior to advancing in step (b), (ii) to the advanced monomer component prior to emulsion forming step (e), or to both (i) and (ii) to form an advanced monomer mixture;

(d) providing a surfactant to the aqueous mixture, the vinyl monomer, the advanced monomer component, the advanced monomer mixture, or any combinations of the aqueous mixture, vinyl monomer, advanced monomer component and advanced monomer mixture;

(e) combining and mixing said aqueous mixture and said advanced monomer mixture in a mixing vessel under conditions effective to produce a water-in-oil emulsion having at least 90 weight percent, based on the emulsion, of water as the internal phase;

(f) heating the emulsion at a temperature of at least about 25° C. to polymerize and crosslink the advanced monomers; and (g) removing at least a portion of water from said cross-linked emulsion thereby producing a porous cross-linked polymeric material.

14. The process of claim 13 in which the one or more vinyl monomers is advanced by a monomer-soluble free-radical polymerization initiator 15. The process of claim 14 in which the advancement initiator is present in an amount of about 0.005 to about 20 weight percent based on the monomer component in step (b).

16. The process of claim 13 in which the one or more vinyl monomers is advanced by a free-radical-producing radiation source selected from the group consisting of gamma rays, electron beams, neutrons and ultra-violet light.

17. The process of claim 15 in which the advancement initiator is an azo compound or a peroxide.

18. The process of claim 17 in which the advancement initiator is selected from the group consisting of alkylperoxycarbonates branched at the 1-carbon position or alkylperoxycarboxylates branched at the α-carbon position and/or 1-carbon position.

19. The process of claim 13 in which the emulsion further comprises additional polymerization initiator.

20. The process of claim 13 further adding one or more additional vinyl monomers in step (c) t form the advanced monomer mixture.

21. The process of claim 13 in which at least one of the vinyl monomers is selected from the group consisting of monoalkenyl arenes, acrylate or methacrylate esters, conjugated diolefins, allenes, olefin halides and mixtures thereof.

22. The process of claim 21 in which the advancement in step (b) is carried out in the further presence of a solvent or a modifier.

23. The process of claim 13 in which the one or more monomers in step (b) is advanced for about 10% to about 90% of the time effective to form a solid.

24. The process of claim 23 in which the one or more monomers in step (b) is advanced for about 35% to about 88% of the time effective to form a solid.

25. A process for the production of a porous cross-linked polymeric material comprising:

(a) providing an aqueous mixture comprising water and an electrolyte;

(b) providing a monomer component comprising at least one vinyl monomer and from about 2 to about 70 weight percent, based on the mixture, of at least one multifunctional unsaturated crosslinking monomer;

(c) advancing at least a portion of said monomer component in the presence of an effective amount of an advancement initiator or by a free-radical-producing radiation source to produce an advanced monomer component having a viscosity ratio of advanced monomer component to the non-advanced monomer component of greater than 1.00;

(d) combining said advanced monomer component and any remaining monomer component if any to provide an advanced monomer mixture;

(e) providing a surfactant to the aqueous mixture, the monomer component, the advanced monomer component, the advanced monomer mixture or any combinations of the aqueous mixture, monomer component, advanced monomer component and advanced monomer mixture;

(f) combining and mixing said aqueous mixture and said advanced monomer mixture in a mixing vessel under conditions effective to produce a water-in-oil emulsion having at least 90 weight percent, based on the emulsion of water as the internal phase;

(g) heating the emulsion at a temperature of at lest about 25° C. to polymerize and crosslink the advanced monomers; and (h) removing at least a portion of water from said cross-linked emulsion thereby producing a porous cross-linked polymeric material.

26. The process of claim 25 in which the monomer mixture is advanced by a monomer-soluble free-radical polymerization initiator.

27. The process of claim 26 in which the advancement initiator is present in an amount of about 0.005 to a bout 20 weight percent based on the monomer component in step (c).

28. The process of claim 27 in which the advancement initiator is an azo compound or a peroxide.

29. The process of claim 25 in which the emulsion further comprises additional polymerization initiator.

30. The process of claim 29 in which the additional polymerization initiator is a monomer-soluble initiator or a water-soluble initiator.

31. The process of claim 25 in which the vinyl monomer is selected from the group consisting of monoalkenyl arenes, acrylate or methacrylate esters, conjugated diolefins, allenes, olefin halides and mixtures thereof.

32. A process for the production of a porous cross-linked polymeric material comprising:

(a) providing an aqueous mixture comprising water and an electrolyte;

(b) providing a monomer component comprising at least one vinyl monomer and from about 2 to about 70 weight percent, based on the mixture, of at least one multifunctional unsaturated crosslinking monomer;

(c) advancing at least a portion of said monomer component in the presence of an effective amount of an advancement initiator or by a free-radical-producing radiation source for about 5% to a bout 95% of the time effective to form solid thereby producing an advanced monomer component;

(d) combining said advanced monomer component and any remaining monomer component if any to provide an advanced monomer mixture (e) providing a surfactant to the aqueous mixture, the monomer component, the advanced monomer component, the advanced monomer mixture or any combinations of the aqueous mixture, monomer component, advanced monomer component and advanced monomer mixture;

(f) combining and mixing said aqueous mixture and said advanced monomer mixture in a mixing vessel under conditions effective to produce a water-in-oil emulsion having at least 90 weight percent, based on the emulsion, of water as the internal phase;

(g) heating the emulsion at a temperature of at least about 25° C. to polymerize and crosslink the advanced monomers; and (h) removing at least a portion of water from said cross-linked emulsion thereby producing a porous cross-linked polymeric material.

33. A process for the production of a porous cross-linked polymeric material comprising:

(a) providing an aqueous mixture comprising water and an electrolyte;

(b) providing a monomer component comprising one or more vinyl monomer, multifunctional unsaturated crosslinking monomer, or a mixture thereof;

(c) providing a surfactant to the aqueous mixture, the monomer component, or to the aqueous mixture and monomer component;

(d) combining and mixing said aqueous mixture and said monomer component in a mixing vessel under conditions effective to produce a water-in-oil emulsion having at least 90 weight percent, based on the emulsion, of water as the internal phase;

(e) advancing one or more vinyl monomers in the presence of an effective amount of an advancement initiator or by a free-radical-producing radiation source to produce an advanced monomer component having a viscosity ratio of advanced monomer component to the non-advanced monomer of greater than 1.00;

(f) adding and mixing the advanced monomer component to the emulsion to form an advanced monomer emulsion;

(g) adding at least one multifunctional unsaturated crosslinking monomer (i) to the one or more vinyl monomers in step (e) prior to advancing, (ii) to the advanced monomer component, (iii) to the advanced monomer emulsion, or to any combination of (i), (ii) and (iii) provided that no multifunctional unsaturated crosslinking monomer is present in step (b);

(h) heating the emulsion at a temperature of at least about 25° C. to polymerize and crosslink the advanced monomers; and (i) removing at least a portion of water from said cross-linked emulsion thereby producing a porous cross-linked polymeric material.

34. The process of claim 33 in which the one or more vinyl monomers is advanced in step (e) by a monomer-soluble free-radical polymerization initiator.

35. The process of claim 34 in which the advancement initiator is present in an amount of about 0.005 to about 20 weight percent based on the one or more vinyl monomers in step (e).

36. The process of claim 33 in which the advanced monomer emulsion further comprises additional polymerization initiator.

37. The process of claim 33 further adding one or more additional vinyl monomers, one or more additional multifunctional unsaturated crosslinking monomers, or a mixture thereof (i) to the advanced monomer component prior to or after advancement in step (e), (ii) to the emulsion, (iii) to the advanced monomer emulsion, or to any combination of (i), (ii) and (iii).

38. The process of claim 33 in which the advancement step (e) is carried out in the further presence of a solvent or a modifier.

39. The process of claim 33 in which the advanced monomer component has viscosity ratio of advanced monomer component to the non-advanced monomer within the range of from about 1.03 to a about 50.

40. A process for the production of a porous cross-linked polymeric material comprising:
   (a) providing an aqueous mixture comprising water and an electrolyte;
   (b) providing a monomer component comprising one or more vinyl monomer, multifunctional unsaturated crosslinking monomer, or a mixture thereof;
   (c) providing a surfactant to the aqueous mixture, the monomer component, or to the aqueous mixture and monomer component;
   (d) combining and mixing said aqueous mixture and said monomer component in a mixing vessel under conditions effective to produce a water-in-oil emulsion having at least 90 weight percent, based on the emulsion, of water as the internal phase;
   (e) advancing one or more vinyl monomers in the presence of an effective amount of an advancement initiator or by a free-radical-producing radiation source for about 5% to about 95% of the time effective to form a solid thereby producing an advanced monomer component;
   (f) adding and mixing the advanced monomer component to the emulsion to form an advanced monomer emulsion;
   (g) adding at least on multifunctional unsaturated crosslinking monomer (i) to the one or more vinyl monomers in step (e) prior to advancing, (ii) to the advanced monomer component, (iii) to the advanced monomer emulsion, or to any combination of (i), (ii) and (iii) provided that no multifunctional unsaturated crosslinking monomer is present in step (b);
   (h) heating the emulsion at a temperature of at least about 25° C. to polymerize and crosslink the advanced monomers; and
   (i) removing at least a portion of water from said cross-linked emulsion thereby producing a porous cross-linked polymeric material.

41. The process of claim 40 in which the advanced monomer emulsion further comprises additional polymerization initiator.

42. The process of claim 40 further adding one or more additional vinyl monomers, one or more additional multifunctional unsaturated crosslinking monomers, or a mixture thereof (i) to the advanced monomer component prior to or after advancement in step (e), (ii) to the emulsion, (iii) to the advanced monomer emulsion, or to any combination of (i), (ii) and (iii).

43. The process of claim 40 in which the one or more monomers in step (b) is advanced for about 10% to about 90% of the time effective to form a solid.

* * * * *